Patented Feb. 8, 1944

2,341,267

UNITED STATES PATENT OFFICE 2,341,267

COMPOSITION CONTAINING A TRIAZINYL HALOGENO CYANOALKYL SULPHIDE

Gaetano F. D'Alelio and James W. Underwood, Pittsfield, Mass., assignors to General Electric Company, a corporation of New York No Drawing. Application May 2, 1942, Serial No. 441,546

20 Claims. (Cl. 260—42)

This invention relates to the production of new materials and more particularly is concerned with new reaction products of particular utility in the plastics and coating arts and which contain, or are produced from, certain halogen compounds hereafter identified. This application is a continuation-in-part of our copending applications Serial Nos. 400,149 and 400,150, filed June 27, 1941, and assigned to the same assignee as the present invention. Serial No. 400,149 has matured into Patent No. 2,317,739, issued April 27, 1943, and Serial No. 400,150 into Patent No. 2,295,561, issued September 15, 1942.

The halogen compounds used in carrying the present invention into effect may be represented by the following general formula:

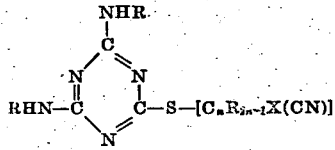

where $n$ represents an integer and is at least 1 and not more than 2, R represents a member of the class consisting of hydrogen and monovalent hydrocarbon and substituted hydrocarbon radicals, more particularly halo-hydrocarbon radicals, and X represents a halogen atom, more particularly a chlorine, bromine, fluorine or iodine atom.

Illustrative examples of radicals that R in the above formula may represent are: aliphatic (e. g., methyl, ethyl, propyl, isopropyl, allyl, methallyl, ethallyl, crotyl, butyl, secondary butyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylpropyl, phenylisopropyl, cinnamyl, etc.); and their homolgues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, fluorophenyl, iodophenyl, dichlorophenyl, chlorocyclohexyl, phenyl chloroethyl, bromoethyl, bromopropyl, etc. Preferably R in Formula I is hydrogen. However, there also may be used in carrying the present invention into effect chemical compounds such, for instance, as those represented by the formulas:

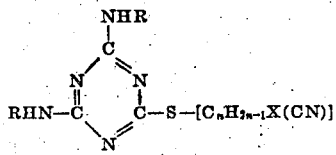

and, more particularly,

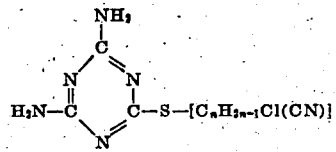

and

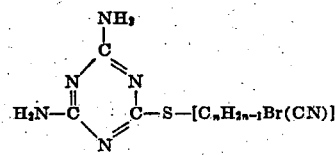

where $n$, R and X have the same meanings as given above with reference to Formula I.

The halogen compounds used in carrying the present invention into effect may be produced in various ways. One suitable method comprises effecting reaction, in the presence of a hydrohalide acceptor, between equimolecular proportions of a monomercapto diamino [(—NHR)$_2$]-s-triazine and a cyanoalkyl dihalide. The reaction advantageously is carried out in a suitable solvent, for example water or a mixture of water and alcohol. The hydrohalide acceptor preferably is an alkali-metal hydroxide, e. g., sodium or potassium hydroxide. The reaction may be represented by the following equation:

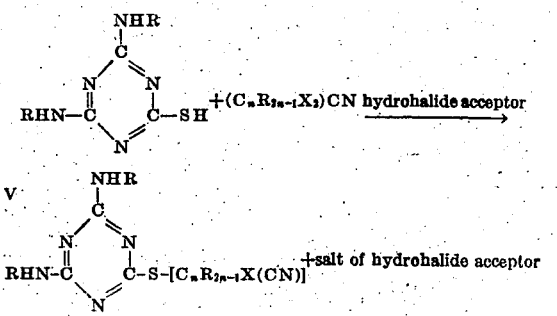

In the above equation $n$, R and X have the same meanings as given above with reference to Formula I.

Specific examples of compounds embraced by Formula I that may be used in carrying the present invention into effect are listed below:

Diamino s-triazinyl chloro cyano-methyl sulphide
Diamino s-triazinyl bromo cyano-methyl sulphide
Diamino s-triazinyl iodo cyano-methyl sulphide
Diamino s-triazinyl fluoro cyano-methyl sulphide
Diamino s-triazinyl alpha-(beta-chloro cyano-ethyl) sulphide
Diamino s-triazinyl beta-(alpha-chloro cyano-ethyl) sulphide
Diamino s-triazinyl beta-(beta-chloro cyano-ethyl) sulphide
Diamino s-triazinyl alpha-(alpha-chloro cyano-ethyl) sulphide
Diamino s-triazinyl alpha-(beta-bromo cyano-ethyl) sulphide
Diamino s-triazinyl beta-(alpha-bromo cyano-ethyl) sulphide
Diamino s-triazinyl beta-(beta-bromo cyano-ethyl) sulphide
Diamino s-triazinyl alpha-(alpha-bromo cyano-ethyl) sulphide
Diamino s-triazinyl alpha-(beta-iodo cyano-ethyl) sulphide
Diamino s-triazinyl beta-(alpha-fluoro cyano-ethyl) sulphide
Diamino s-triazinyl beta-(alpha-phenyl alpha-chloro cyano-ethyl) sulphide
Diamino s-triazinyl beta-(alpha-methyl alpha-chloro cyano-ethyl) sulphide
Diamino s-triazinyl beta-(beta-chloro cyano-butyl) sulphide
Diamino s-triazinyl alpha-(beta-chloro beta-phenyl cyano-propyl) sulphide
4-methylamino 6-amino s-triazinyl-2 naphthyl chloro cyano-methyl sulphide
4,6-di-(methylamino) s-triazinyl-2 chloro cyano-methyl sulphide
4,6-di-(ethylamino) s-triazinyl-2 bromo cyano-methyl sulphide
4,6 - di - (anilino) s - triazinyl - 2 alpha - (beta-chloro cyano-ethyl) sulphide
4,6-di-(iodoanilino) s-triazinyl-2 beta-(alpha-bromo cyano-ethyl) sulphide
4,6-di-(methylamino) s-triazinyl-2 beta-(alpha-cyclohexyl beta-phenethyl alpha-chloro cyano-ethyl) sulphide
4,6-di-(anilino) s-triazinyl-2 beta - (beta-tolyl beta-xylyl alpha-chloro cyano-ethyl) sulphide
4,6-di-(fluorotoluido) s-triazinyl-2 alpha-(beta-chloro cyano-ethyl) sulphide
4-methylamino 6-anilino s-triazinyl-2 beta-(alpha-benzyl alpha-chloro cyano-propyl) sulphide
4-ethylamino 6-toluido s-triazinyl-2 beta-[alpha-bromo alpha-cyclohexyl beta,beta-di-(hydroxyphenyl) cyano-ethyl] sulphide
Diamino s-triazinyl beta-(alpha-chlorophenyl alpha-chloro cyano-ethyl) sulphide
4-xylidino 6-naphthylamino s-triazinyl-2 beta-(alpha-phenyl alpha-iodo beta-phenyl beta-cyclopentyl cyano-ethyl) sulphide
4-cyclohexylamino 6-benzylamino s-triazinyl-2 beta-(alpha-bromo alpha-bromomethyl beta-hydroxynaphthyl cyano-ethyl) sulphide
4-chlorobenzylamino 6-chloroanilino s-triazinyl-2 alpha - (alpha - methyl beta - phenyl beta-chloro cyano-ethyl) sulphide
4,6-di-(cyclohexenylamino) s-triazinyl-2 chloro cyano-methyl sulphide
4,6-di-(cyclopentylamino) s-triazinyl-2 bromo cyano-methyl sulphide The present invention is based on our discovery that new and valuable materials of particular utility in the plastics and coating arts can be produced by effecting reaction between ingredients comprising essentially an aldehyde, including polymeric aldehydes, hydroxy aldehydes and aldehyde-addition products, and a halogenated compound of the kind embraced by Formula I, numerous examples of which have been given above. These new reaction products are not only valuable in themselves, but find particular utility when incorporated into an acid-curing thermosetting resin, for example acid-curing thermosetting phenoplasts and aminoplasts. For instance, we may add a soluble, fusible aldehyde-reaction product of the halogen compound to an acid-curing thermosetting resin and heat the resulting mixture. The aldehydic reaction product accelerates the conversion of the acid-curing thermosetting resin to an insoluble, infusible state. Or, we may cause the halogen compound itself to react with the acid-curing thermosetting resin and thus accelerate the curing of the resin. Or, we may form a rapidly curing resin by effecting reaction between ingredients comprising a halogen compound of the kind embraced by Formula I, an aldehyde, including polymeric aldehydes, hydroxy aldehydes and aldehyde-addition products, and a phenol (including phenol itself, cresols, xylenols, etc.) or an amino or amido compound (including imino and imido compounds), for instance melamine, ammeline, ammelide, melem, melam, melon, triureido melamine, also aminotriazoles, e. g., guanazole, aminodiazines, e. g., 2,4,6-triamino pyrimidine, a urea, e. g., urea itself, thiourea, dicyandiamide, etc.

The resin syrups and molding compositions of this invention may be stored for long periods of time without material alteration. In marked contrast the prior acid-curing thermosetting resins, more particularly those containing direct or active curing catalysts such as mineral acids, e. g., hydrochloric, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In practicing the present invention the condensation between the reactants may be carried out under acid, alkaline or neutral conditions and at normal or at elevated temperatures. Any substance or catalyst which has an alkaline or an acid nature may be used to obtain the acid, alkaline or neutral condition, for example ammonia, sodium hydroxide, calcium hydroxide, methyl amine, diethyl amine, tributyl amine, ethanol amines, tri-isopropanol amine, etc.; mixtures of such alkaline substances; inorganic or organic acids such as hydrochloric, sulphuric, phosphoric, acetic, acrylic, crotonic, malonic, etc.; mixtures of such acids; acid salts such as sodium acid sulphate, monosodium phosphate, monosodium phthalate, etc.; basic salts such as ammonium carbonate, potassium carbonate, sodium actetate, etc.; or mixtures of such salts.

We may condense the components used in practicing this invention under various conditions. For example, all the components may be mixed together and the reaction caused to proceed under acid, alkaline or neutral conditions. Or, we may form an acid-curing thermosetting resin (e. g., an acid-curing partial condensation product of ingredients comprising a phenol and an aldehyde, an acid-curing partial condensation product of ingredients comprising an amidogen compound, e. g., melamine, malonic diamide, maleic diamide, urea, thiouera, etc., and an aldehyde), add the herein-described halogen compound thereto and effect further condensation. Or, we may first partially condense the halogen compound with a molecular excess of an aldehyde under acid, alkaline or neutral conditions and then add thereto at least one other aldehyde-reactable organic compound, e. g., a phenol, a urea, aniline, etc., and effect further condensation. Also, we may separately partially condense a halogen compound of the kind embraced by Formula I and a different aldehyde-reactable organic compound with an aldehyde and then mix the two products of partial condensation and effect further condensation therebetween. The components of each reaction product may be initially condensed under acid, neutral or alkaline conditions and at normal or at elevated temperatures.

Still other ways may be employed in combining the components and in producing the unmodified and modified condensation products of this invention, as readily will be understood by those skilled in the art as the description of the invention proceeds. These condensation reactions may be carried out under a wide variety of time, pressure and temperature conditions. The temperature of reaction may vary, for example, from room temperature to the reflux temperature of the reactants at reduced, atmospheric or superatmospheric pressures.

In order that those skilled in the art better may understand how the present invention may be carried into effect, the following illustrative examples thereof are given. All parts are by weight.

*Example 1*

A mixture of the following components was first prepared:

| | Parts |
|---|---|
| Urea | 300 |
| Aqueous formaldehyde (approx. 37.1% HCHO) | 650 |
| Aqueous ammonia (approx. 28% NH₃) | 30 |
| Aqueous solution of sodium hydroxide (0.46 N) | 16 |

This mixture was then processed further as follows:

A. Eighty (80) parts of the above mixture and 0.4 part diamino s-triazinyl bromo cyano-ethyl sulphide were heated together under reflux at the boiling temperature of the mass for 15 minutes.

B. Eighty (80) parts of the above mixture was refluxed at the boiling temperature of the mass for 15 minutes. Four-tenths (0.4) part of diamino s-triazinyl bromo cyano-ethyl sulphide was added to the resulting urea-formaldehyde partial condensation product and refluxing was continued for an additional 6 minutes.

C. The same components were used and the same procedure was followed as described under B with the exception that the reaction mass was not refluxed further after adding the diamino s-triazinyl bromo cyano-ethyl sulphide.

Each of the resinous syrups of A, B and C was mixed with 27 parts alpha cellulose in flock form and 0.2 part of a mold lubricant, specifically zinc stearate, to form a molding (moldable) composition. The resulting wet molding compounds were partially dried at 60° C. and then at room temperature until sufficient moisture had been removed to provide materials that could be molded satisfactorily. Samples of each of the dried and ground molding compounds were molded for 5 minutes at 135° C. under a pressure of 3,500 pounds per square inch. In all cases well-cured molded pieces having well-knit and homogeneous structures were obtained. The plastic flow of each of the molding compounds during molding was very good.

*Example 2*

| | Parts |
|---|---|
| Melamine | 252 |
| Aqueous formaldehyde (approx. 37.1% HCHO) | 486 |
| Aqueous solution of sodium hydroxide (0.46 N) | 20 |
| Aqueous ammonia (approx. 28% NH₃) | 26 | were heated together under reflux at the boiling temperature of the mass for 1 minute, yielding a clear solution. Portions of this solution were then treated as described below:

A. Eighty (80) parts of the solution were heated under reflux at boiling temperature for 17 minutes. Three-tenths (0.3) part diamino s-triazinyl bromo cyano-ethyl sulphide was then added and refluxing was continued for an additional 5 minutes.

B. The same amount of solution was used and the same refluxing time as described under A. However, instead of adding the diamino s-triazinyl bromo cyano-ethyl sulphide to the resinous syrup, it was incorporated with the filler during the preparation of a molding compound and this mixture then was mixed with the resinous syrup.

The resinous syrup of A was mixed with 27 parts alpha cellulose and 0.2 part zinc stearate. The syrupy condensation product of B was mixed with the same amounts of alpha cellulose and zinc stearate plus 0.8 part diamino s-triazinyl bromo cyano-ethyl sulphide. Each of the molding compounds produced in this manner then was dried partially at 70° C. and finally at room temperature. Samples of the dried and ground molding compounds were molded into the form of disks, using in each case a molding time of 3 minutes, a molding temperature of 135° C. and a molding pressure of 3,500 pounds per square inch. The molded pieces were well cured and each had a well-knit and homogeneous structure. The water resistance of the molded pieces was excellent. For example, the resinous syrup of B, when made into a molding composition and molded as above described, yielded a molded article that absorbed only 0.37% by weight of water when immersed in boiling water for 15 minutes followed by immersion in cold water for 5 minutes. The plastic flow of each of the molding compounds during molding was very good.

Example 3

| | Parts |
|---|---|
| Thiourea | 51.0 |
| Aqueous formaldehyde (approx. 37.1% HCHO) | 77.0 |
| Aqueous ammonia (approx. 28% NH$_3$) | 5.1 |
| Aqueous solution of sodium hydroxide (0.46 N) | 3.3 |
| Diamino s-triazinyl bromo cyano-ethyl sulphide | 2.5 | were heated together under reflux at the boiling temperature of the mass for 20 minutes. The resulting resinous syrup was mixed with 46 parts alpha cellulose and 0.2 part zinc stearate to form a molding compound. The wet molding composition was dried at 70° C. until sufficient moisture had been removed to provide a material that could be molded satisfactorily. A well-cured molded piece was produced by molding a sample of the dried and ground molding compound for 5 minutes at 135° C. under a pressure of 3,500 pounds per square inch. The plastic flow of the molding compound during molding was very good. The molded article had excellent water resistance and a well-knit and homogeneous structure.

Example 4

| | Parts |
|---|---|
| Diamino s-triazinyl bromo cyano-ethyl sulphide | 55.0 |
| Aqueous formaldehyde (approx. 37.1% HCHO) | 194.4 | were heated together under reflux at the boiling temperature of the mass for 3 minutes, yielding a resinous reaction product which cured with good flow characteristics when a sample of it was heated on a 150° C. hot plate. A satisfactory molding compound and molded article were produced by mixing a portion of the resinous syrup with an equal weight of alpha cellulose, drying the resulting wet composition and molding the dried compound for 5 minutes at 140° C. under a pressure of 9,000 pounds per square inch.

Instead of heating the reactants under reflux as above described, the mixture may be shaken for a longer period, for example 24 to 72 hours or longer at room temperature (20–30° C.) to effect reaction between the components and to obtain a soluble, fusible reaction product.

Example 5

A phenol-formaldehyde partial condensation product was prepared by heating together the following components, with constant agitation, for 2½ hours at approximately 85–90° C.

| | Parts |
|---|---|
| Phenol | 180.0 |
| Aqueous formaldehyde (approx. 37.1% HCHO) | 390.0 |
| Sodium carbonate (anhydrous) | 4.4 |

Due to a slight exothermic reaction the temperature rose for a brief period to 96° C. The resinous syrup produced in this manner is identified in the following formula as "syrupy phenolic resin":

| | Parts |
|---|---|
| Syrupy phenolic resin | 30.0 |
| Diamino s-triazinyl bromo cyano-ethyl sulphide | 2.07 |
| Glycerine | 2.0 |

The phenolic resin, which initially was dark red in color, became lighter in color as the diamino s-triazinyl bromo cyano-ethyl sulphide lowered the pH of the solution. The reaction mixture was heated slowly under reduced pressure (55 mm. mercury) until an internal resin temperature of 60° C. was reached. The resulting molasses-like liquid resin was poured into a container and heated therein for 48 hours at 70° C. The resin cured to an insoluble and infusible state. The solidified resin was hard, smooth, homogeneous, fairly light in color and opaque. This latter characteristic was due mainly to the fact that the liquid casting resin had been insufficiently dehydrated. The solid resin was clear in its upper portion where the water could escape.

Example 6

| | Parts |
|---|---|
| Urea | 30.0 |
| Aqueous formaldehyde (approx. 37.1% HCHO) | 67.0 |
| Aqueous ammonia (approx. 28% NH$_3$) | 3.5 |
| Aqueous solution of sodium hydroxide (0.5 N) | 1.6 | were heated together under reflux at the boiling temperature of the mass for 20 minutes, yielding a resinous syrup that is identified in the following formula as "urea-formaldehyde syrup":

| | Parts |
|---|---|
| Urea-formaldehyde syrup | 102.0 |
| Reaction product of Example 4 | 9.1 |

These components were heated together under reflux at the boiling temperature of the mass for 2 minutes. The resulting resinous syrup was mixed with 34 parts alpha cellulose and 0.2 part zinc stearate to form a molding composition. The wet molding compound was dried at room temperature until sufficient moisture had been removed to provide a material that could be molded satisfactorily. A sample of the dried and ground molding compound was molded for 5 minutes at 140° C. under a pressure of 12,000 pounds per square inch. A well-cured molded piece was obtained.

Example 7

| | Parts |
|---|---|
| Melamine | 32.0 |
| Aqueous formaldehyde (approx. 37.1% HCHO) | 61.0 |
| Aqueous ammonia (approx. 28% NH$_3$) | 1.5 |
| Aqueous solution of sodium hydroxide (0.5 N) | 1.25 | were heated together under reflux at the boiling temperature of the mass for 15 minutes, yielding a resinous syrup that is identified in the following formula as "melamine-formaldehyde syrup":

| | Parts |
|---|---|
| Melamine-formaldehyde syrup | 96.0 |
| Reaction product of Example 4 | 4.6 |

These components were heated together under reflux at the boiling temperature of the mass for 1 minute. A molding compound was prepared by mixing 32 parts alpha cellulose and 0.2 part zinc stearate with the resulting resinous syrup. This compound was dried and molded as described under Example 6 with the exception that a molding time of 4 minutes and a molding pressure of 8,000 pounds per square inch were employed. A well-cured molded piece having excellent resistance to water was obtained, as evidenced by the fact that it absorbed only 0.65% by weight of water when tested for its water-resistance characteristics as described under Example 2.

Example 8

| | Parts |
|---|---|
| Dimethylol urea (commercial grade containing approx. 11% by weight of water) | 60.0 |
| Aqueous ammonia (approx. 28% NH₃) | 3.5 |
| Aqueous solution of sodium hydroxide (0.5 N) | 1.6 |
| Water | 42.0 | were heated together under reflux at the boiling temperature of the mass for 20 minutes, yielding a resinous syrup that is identified in the following formula as "dimethylol urea syrup":

| | Parts |
|---|---|
| Dimethylol urea syrup | 107.0 |
| Reaction product of Example 4 | 9.1 |

These components were heated together at the boiling temperature of the mass for 4 minutes. A molding compound was prepared from the resulting syrup by mixing therewith 36 parts alpha cellulose and 0.2 part zinc stearate. The wet molding compound was dried and molded as described under Example 6 with the exception that a molding pressure of 6,500 pounds per square inch was employed. A well-molded product which which was not so resistant to water as the molded piece of Example 7 was obtained. The plasticity of the compound during molding was somewhat better than that of the molding compounds of Examples 6 and 7. The molded article had about the same cohesive characteristics and the same evenness of structure as the molded article of Example 7.

Example 9

| | Parts |
|---|---|
| Trimethylol melamine (crystalline) | 43.0 |
| Aqueous ammonia (approx. 28% NH₃) | 1.2 |
| Aqueous solution of sodium hydroxide (0.5 N) | 1.0 |
| Water | 30.4 | were heated together under reflux at the boiling temperature of the mass for 5 minutes, yielding a resinous syrup that is identified in the following formula as "trimethylol melamine syrup":

| | Parts |
|---|---|
| Trimethylol melamine syrup | 76.0 |
| Reaction product of Example 4 | 4.6 |

These ingredients were heated together under reflux at the boiling temperature of the mass for 2 minutes. The resulting resinous syrup was mixed with 25 parts alpha cellulose and 0.1 part zinc stearate to form a molding compound. The wet molding composition was dried and molded as described under Example 6 with the exception that a molding pressure of 9,000 pounds per square inch was employed. The molded article was well cured and had very good resistance to water, as shown by the fact that it absorbed only 2.17% by weight of water when tested for its water-resistance characteristics as described under Example 2.

Example 10

| | Parts |
|---|---|
| 1-phenyl guanazole | 35.0 |
| Aqueous formaldehyde (approx. 37.1% HCHO) | 32.4 |
| Aqueous ammonia (approx. 28% NH₃) | 1.2 |
| Aqueous solution of sodium hydroxide (0.5 N) | 0.8 |
| Reaction product of Example 4 | 9.1 | were heated together in an open reaction vessel for 3 minutes, at the end of which period of time separation of a resinous mass took place. The reaction mixture was mixed with 23 parts alpha cellulose and 0.1 part zinc stearate to form a molding compound. The wet molding composition was dried and molded as described under Example 6 with the exception that a molding pressure of 5,600 pounds per square inch was used. The molded article was well cured and absorbed only 1.63% by weight of water when tested for its water-resistance characteristics as described under Example 2. The plasticity of the molding compound during molding was somewhat better than that of the molding compounds of Examples 6, 7 and 9. The molded article showed approximately the same cohesive characteristics and evenness of structure as the molded pieces of Examples 7 and 8.

It will be understood, of course, by those skilled in the art that the reaction between the components may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples under reflux at boiling temperature as mentioned in the individual examples, the reaction between the components may be carried out at temperatures ranging, for example, from room temperature up to the boiling temperature of the mass using substantially longer reaction periods.

It also will be understood by those skilled in the art that our invention is not limited to condensation products obtained by reaction of ingredients comprising an aldehyde and the specific halogen compound named in the above illustrative examples. Thus, instead of using a diamino s-triazinyl bromo cyano-ethyl sulphide we may use, for example, other diamino s-triazinyl halogeno cyano-ethyl sulphides (e. g., a diamino s-triazinyl chloro cyano-ethyl sulphide, a diamino s-triazinyl iodo cyano-ethyl sulphide, a diamino s-triazinyl fluoro cyano-ethyl sulphide), a diamino s-triazinyl halogeno cyano-methyl sulphide (e. g., diamino s-triazinyl chloro cyano-methyl sulphide, diamino s-triazinyl bromo cyano-methyl sulphide, etc.) or any other halogen compound (or mixture thereof) embraced by Formula I, numerous specific examples of which have been given hereinbefore.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, heptaldehyde, benzaldehyde, octaldehyde, furfural, hydroxy aldehydes (e. g., glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-methylol derivatives of urea, thiourea, selenourea and iminourea (numerous examples of which are given in D'Alelio copending application Serial No. 377,524, filed February 5, 1941), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Particularly good results are obtained with active methylene-containing bodies such as a methylol urea, more particularly mono- and di-methylol ureas, and a methylol melamine, more particularly monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the halogen compound may be varied over a wide range depending upon the particular properties desired in the final product and the particular halogen compound used as a starting reactant. Thus, we may use, for example, from 0.5 to 8 or 9 or more mols of an aldehyde for each mol of the halogen compound. When the aldehyde is available for reaction in the form of an alkylol derivative, more particularly a methylol derivatve such, for instance, as dimethylol urea, trimethylol melamine, etc., then higher amounts of such aldehyde-addition products ordinarily are used, for example from 1 to 15 or 20 or more mols of such alkylol derivative for each mol of the halogen compound.

When the halogen compound of the kind embraced by Formula I is used primarily as an intercondensable curing reactant for accelerating the conversion of acid-curing thermosetting resins to an insoluble, infusible state, only a relatively small amount of the halogen compound ordinarily is required, for example an amount corresponding to from 0.2 or 0.3% to 5 or 6% by weight of the resin to be cured, calculated on the basis of the dry resin. In some cases it may be desirable to use higher amounts, for instance up to 8 or 9 or more parts by weight of the halogen compound per 100 parts (net dry) of the acid-curing thermosetting resin. When the halogen compound of the kind embraced by Formula I is incorporated into the acid-curing thermosetting resin in the form of a soluble, fusible aldehyde-reaction product thereof, then higher amounts of such reaction product ordinarily are used as compared with the amount employed when using the halogen compound itself. The halogen compound or its partial reaction product with an aldehyde may be incorporated into the acid-curing thermosetting resin either prior to, during or after the formation of the resin or prior to, during or after the formation of a molding composition containing the acid-curing thermosetting resin.

Examples of acid-curing thermosetting resins, the curing of which is accelerated by the halogen compounds herein described or by their soluble, fusible aldehyde-reaction products, are the acid-curing phenol-aldehyde resins, melamine-formaldehyde resins, aminotriazole-aldehyde resins, aminodiazine-aldehyde resins, urea-aldehyde resins, urea-melamine-formaldehyde resins, protein-aldehyde resins, e. g., casein-formaldehyde resins, resinous condensation products of aldehydes such as formaldehyde with polyamides as, for instance, malonic diamide, maleic diamide, fumaric diamide, itaconic diamide, etc. Other examples of amino or amido compounds (amidogen compounds) that may be condensed with aldehydes such as hereinbefore mentioned by way of illustration in forming an acid-curing thermosetting resin, more particularly an acid-curing aminoplast, are thiourea, diurea, diethylene triurea, methyl urea, acetyl urea, benzoyl urea, phenyl thiourea, assymetrical diethyl urea, allyl urea, 2-chloroallyl urea, ethylidene urea, guanyl urea, biguanide, aminoguanidine, melamine, triureido melamine, ammeline, ammelide, melem, melam, melon, aminotriazoles, aminodiazines, etc. Suitable mixtures of such compounds also may be used.

Phenol itself and various substituted phenols, for example, the cresols, the xylenols, etc., may be condensed with aldehydes, e. g., formaldehyde, furfural, mixtures of formaldehyde and furfural, etc., to form acid-curing thermosetting resins of the phenoplast type, and these thermosetting resins then can be cured to the insoluble and infusible state with the aid of the herein-described halogen compounds or with the soluble, fusible aldehyde-reaction products thereof.

If desired, the fundamental reaction products of this invention may be modified by introducing other bodies before, during or after condensation between the primary components. Numerous examples of modifying agents that may be employed are given, for instance, in D'Alelio and Holmes Patent No. 2,265,688, issued December 9, 1941, page 3, column 2, lines 53–75, page 4, column 1, lines 1–40, which patent is assigned to the same assignee as the present invention.

Thermosetting molding compositions comprising a filler and an acid-curing thermosetting resin carrying a curing agent comprising a halogen compound of the kind described herein, or a soluble, fusible aldehyde-reaction product of such a halogen compound, may be molded into a variety of shapes under heat and pressure, more particularly at temperatures of the order of 100° to 200° C., preferably from approximately 120° to 180° C. The molding compositions show good plastic flow during molding since the curing agent not only functions as such but also generally serves to impart improved plastic flow to the molding composition. Molded articles of manufacture comprising the molded, heat-hardened molding compositions of this invention have a good surface finish, show no evidence of "bleeding" the curing agent, are well cured throughout, and show no loss in any of their other useful properties due to the presence of the herein-described halogen compound or aldehyde-reaction product thereof.

What we claim as new and desire to secure by Letters Patent of the United States is:

1. A composition comprising an acid-curing, thermosetting resin carrying a curing agent therefor comprising a compound selected from the class consisting of (1) compounds corresponding to the general formula

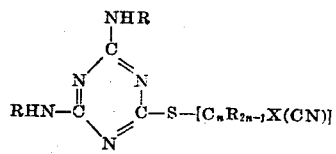

where $n$ represents an integer and is at least 1 and not more than 2, R represents a member of the class consisting of hydrogen and monovalent hydrocarbon and halo-hydrocarbon radicals, and X represents a halogen atom; and (2) soluble, fusible aldehyde-reaction products of the compounds of (1).

2. A composition comprising an acid-curing, thermosetting, phenol-aldehyde resin having incorporated therein a compound corresponding to the general formula

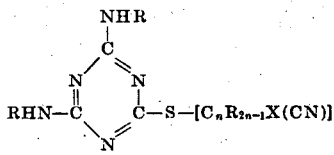

where $n$ represents an integer and is at least 1 and not more than 2, R represents a member of the class consisting of hydrogen and monovalent hydrocarbon and halo-hydrocarbon radicals, and X represents a halogen atom.

3. A composition comprising an acid-curing, thermosetting, amidogen-aldehyde resin having incorporated therein a compound corresponding to the general formula

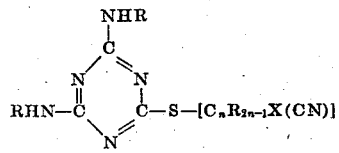

where $n$ represents an integer and is at least 1 and not more than 2, R represents a member of the class consisting of hydrogen and monovalent hydrocarbon and halo-hydrocarbon radicals, and X represents a halogen atom.

4. A composition of matter comprising the product of reaction of ingredients comprising an aldehyde and a compound corresponding to the general formula

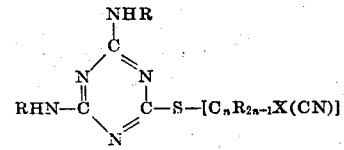

where $n$ represents an integer and is at least 1 and not more than 2, R represents a member of the class consisting of hydrogen and monovalent hydrocarbon and halo-hydrocarbon radicals, and X represents a halogen atom.

5. A composition as in claim 4 wherein the aldehyde is formaldehyde.

6. A composition comprising the product of reaction of ingredients comprising a phenol, an aldehyde and a compound corresponding to the general formula

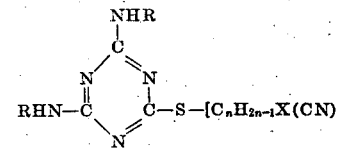

where $n$ represents an integer and is at least 1 and not more than 2, R represents a member of the class consisting of hydrogen and monovalent hydrocarbon and halo-hydrocarbon radicals, and X represents a halogen atom.

7. A composition comprising the product of reaction of ingredients comprising a urea, an aldehyde and a compound corresponding to the general formula

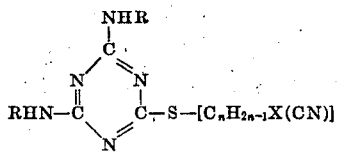

where $n$ represents an integer and is at least 1 and not more than 2, R represents a member of the class consisting of hydrogen and monovalent hydrocarbon and halo-hydrocarbon radicals, and X represents a halogen atom.

8. A heat-curable resinous condensation product of ingredients comprising urea, formaldehyde and a compound represented by the general formula

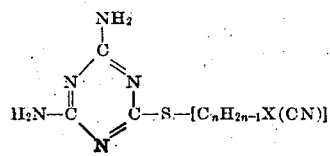

where $n$ represents an integer and is at least 1 and not more than 2, and X represents a halogen atom.

9. A product comprising the cured resinous condensation product of claim 8.

10. A condensation product as in claim 8 wherein X represents a chlorine atom.

11. A condensation product as in claim 8 wherein X represents a bromine atom.

12. A composition comprising the resinous product of reaction of ingredients comprising melamine, formaldehyde and a compound corresponding to the general formula

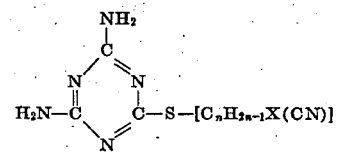

where $n$ represents an integer and is at least 1 and not more than 2, and X represents a halogen atom.

13. A composition comprising the resinous product of reaction of (1) a partial condensation product of ingredients comprising a phenol and an aldehyde, and (2) a compound corresponding to the general formula

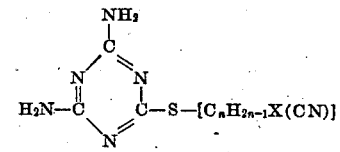

where $n$ represents an integer and is at least 1 and not more than 2, and X represents a halogen atom.

14. A composition comprising the resinous product of reaction of (1) a partial condensation product of ingredients comprising a urea and an aldehyde, and (2) a compound corresponding to the general formula

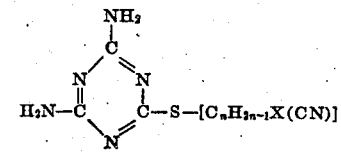

where $n$ represents an integer and is at least 1 and not more than 2, and X represents a halogen atom.

15. A composition comprising the product of reaction of ingredients comprising an aldehyde and a diamino s-triazinyl halogeno cyano-ethyl sulphide.

16. A resinous composition comprising the product of reaction of (1) a partial condensation product obtained by reaction, while admixed with an alkaline substance, of ingredients comprising urea and formaldehyde, and (2) a diamino s-triazinyl halogeno cyano-ethyl sulphide.

17. A composition comprising the resinous product of reaction of (1) a partial condensation product obtained by reaction, while admixed with an alkaline substance, of ingredients comprising melamine and formaldehyde, and (2) a diamino s-triazinyl halogeno cyano-ethyl sulphide.

18. A composition comprising the resinous product of reaction of ingredients comprising urea, formaldehyde and a diamino s-triazinyl bromo cyano-ethyl sulphide.

19. The method of preparing new condensation products which comprises effecting reaction between ingredients comprising an aldehyde and a compound corresponding to the general formula

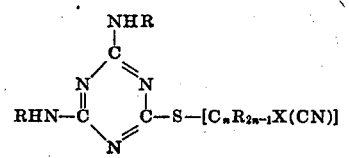

where $n$ represents an integer and is at least 1 and not more than 2, R represents a member of the class consisting of hydrogen and monovalent hydrocarbon and halo-hydrocarbon radicals, and X represents a halogen atom.

20. The method which comprises effecting partial reaction between ingredients comprising urea and formaldehyde under alkaline conditions, adding to the resulting condensation product a small amount of a diamino s-triazinyl halogeno cyano-ethyl sulphide, and causing the said sulphide to intercondense with the said partial condensation product.

GAETANO F. D'ALELIO.
JAMES W. UNDERWOOD.